Feb. 6, 1934.  W. AMES  1,945,796
GAUGE
Filed March 19, 1930
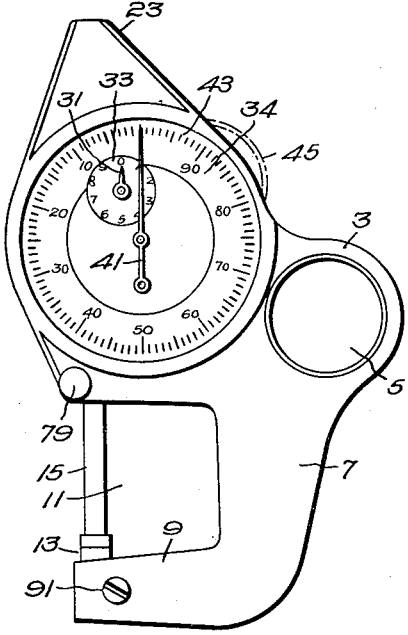
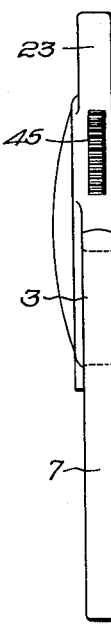
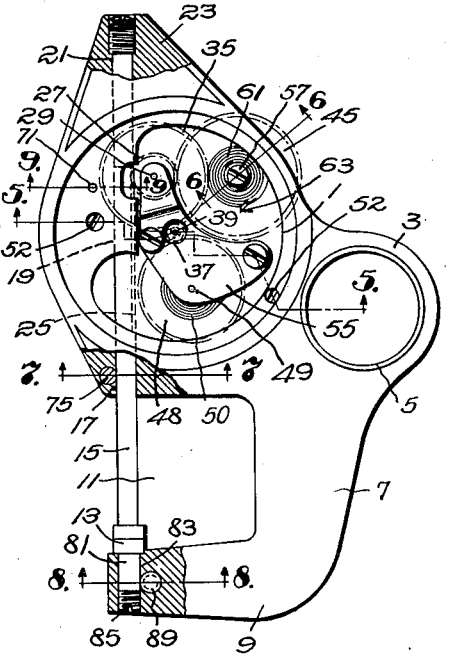
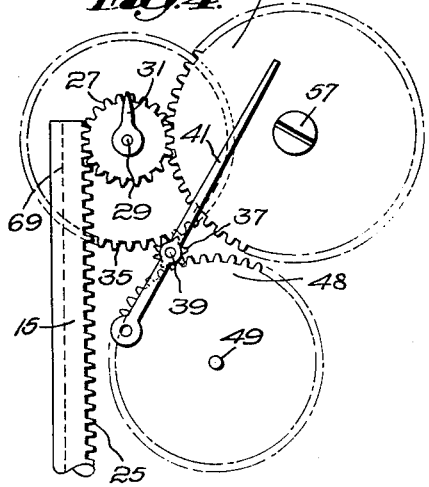
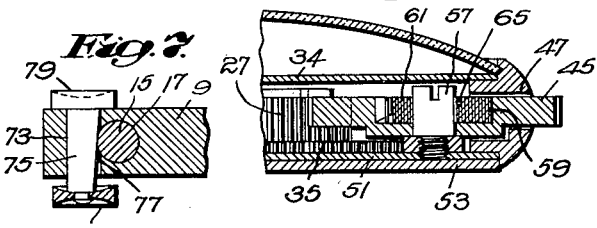
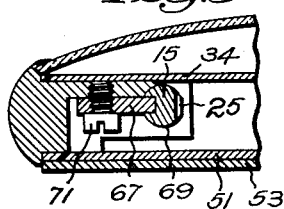
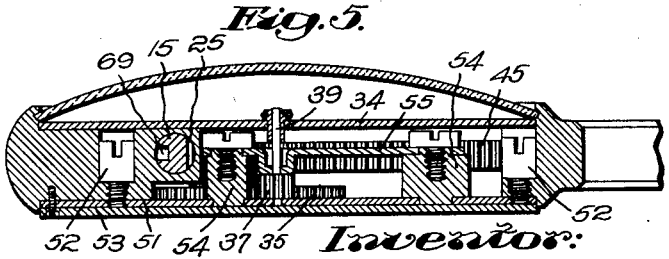
Inventor:
Warren Ames
by Emery Booth Varney & Townsend Attys Patented Feb. 6, 1934

1,945,796

UNITED STATES PATENT OFFICE 1,945,796

GAUGE

Warren Ames, Waltham, Mass.

Application March 19, 1930. Serial No. 437,084

11 Claims. (Cl. 33—147)

My invention relates to gauges, and particularly, though not exclusively, to hand-held micrometer gauges.

The invention will be best understood from the following description when read in the light of the accompanying drawing of one embodiment of the invention, the scope of which latter will be more particularly pointed out in the appended claims.

In the drawing:—

Fig. 1 is a front elevation of a gauge constructed according to the invention;

Fig. 2 is an elevation of the gauge according to Fig. 1, as viewed from the right;

Fig. 3 is an elevation corresponding to Fig. 1 with the crystal and dial plate removed;

Fig. 4 is a more or less schematic view of the gearing of the gauge; and

Figs. 5, 6, 7, 8 and 9 are respectively sections on the lines 5—5, 6—6, 7—7, 8—8 and 9—9 of Fig. 3.

Referring to the drawing, the gauge illustrated comprises a plate-like member, the upper portion of which is cut away to form an opening 1 for receiving the indicator mechanism so that the adjacent surrounding portions form a casing for said mechanism. Adjacent the casing is provided a handle member 3 which herein is formed by the opening 5 in the plate member. Extending laterally from the portion of the plate member which forms the casing and handle member is a projection 7, the lower end of which is provided with a lateral projection 9, the construction being such as to provide a space 11 between the casing and the lateral projection 9 for receiving the work to be measured. As shown, an anvil 13, carried by the projection 9, and a reciprocatory contact feeler rod 15 are provided for engaging the opposite surfaces of the work to be measured.

As shown, the rod 15 is reciprocally mounted in bores 17, 19 and 21 so positioned that the rod extends through the part of the plate member which forms the casing for the indicator mechanism. Herein, the upper portion 23 of the plate member forms a projection extending from the casing for protecting and receiving and guiding the contact feeler rod 15 when the latter is in the upper portion of its travel.

Herein, the rod 15 is provided with rack teeth 25, with which teeth meshes a rack pinion 27, the spindle 29 of the latter carrying an indicator hand 31 which cooperates with graduations 33 on a dial plate 34 for indicating movements of the contact feeler rod, said dial, for example, being graduated into tenths of an inch. On the spindle 29 of the rack pinion is a larger gear 35 which meshes with a center pinion 37 on a spindle 39, the upper end of which latter carries an indicator hand 41 cooperating with graduations 43 on the dial plate, these latter graduations, for example, indicating thousandths of an inch for indicating fine degrees of movement of the contact feeler rod, or in other words, with the dials graduated as shown in the drawings the center pinion will rotate ten times the number of revolutions made by the rack pinion.

Herein, is provided a gear wheel 45 meshing with the rack pinion 27, a portion of the periphery of said gear wheel extending through a slot 47 (Fig. 6) formed in the wall of the casing for the indicator mechanism so that the rod 15 may be manually operated. As shown, a gear wheel 48 mounted on a spindle 49 and having a cooperating torsion spring 50 meshes with the center pinion 37 for taking up lost motion in the train of gearing.

As illustrated, the opening 1 in the plate member, in which opening is positioned the indicator mechanism, is closed by a back plate 51 secured to the plate member by screws 52, and over the back plate is secured a finishing plate 53. Herein, the back plate has secured thereto spacing blocks 54 (Fig. 5) for a plate 55, in which latter are formed upper bearings for the various spindles of the gear mechanism for the indicator mechanism, while the lower bearings are provided by the back plate. This construction in respect to the spindle 39 is clearly shown in Fig. 5.

Herein, the gear wheel 45 is mounted on a pin 57 carried by the back plate and, as shown, said gear wheel is provided with a recess 59 which receives a torsion spring 61, one end of which is secured to the gear wheel at 63 and the other end to a pin 65 projecting from the pin 57. The torsion spring 61 constantly urges rotation of the gear wheel 45 in that direction which will cause the contact feeler rod 15 to be moved toward the anvil 13, so that when the gear wheel 45 is manually rotated to move the contact feeler rod 15 away from the anvil 13 to permit the work to be placed between the ends of the contact feeler rod and anvil, and the gear wheel 45 is released, the contact feeler rod will automatically move into contact with the work. The gauge may be conveniently supported by inserting the index finger through the opening 5, under which conditions the gear wheel 45 may be rotated by the thumb of the same hand.

Herein, rotation of the contact feeler rod 15 is prevented by means of a key 67 (Fig. 9) which, as shown, is in the form of a plate having an edge which enters a longitudinal groove 69 formed in the contact feeler rod, the key or plate 67 being secured to the casing for the indicator mechanism by a screw 71.

For locking the contact feeler rod in a retracted position to permit the gauge to be used as a "set" gauge, the portion of the plate which forms the casing for the indicator mechanism is herein provided with a cylindrical bore 73, the side of which intersects the side of the bore 17 for the contact feeler rod, so that the latter projects laterally across a side of the bore 73. In the bore 73 is a cylindrical pin 75, one side of which has a flat taper 77 adapted to contact with the contact feeler rod. As shown, the length of the pin is greater than the thickness of the plate in which the casing for the indicator mechanism is formed, and at its opposite ends the pin is provided with heads 79 so that it may be moved longitudinally in one direction in the bore 73 to act as a wedge to lock the rod 15 against movement, and may be moved in the opposite direction to release the rod and permit movement thereof.

As shown, the anvil 13 has a shank 81 fitting into a bore 83 in the lateral projection 9 of the gauge, the lower end of the bore being screw threaded and receiving the screw 85, which latter can be used for moving the contact feeler rod 15 for adjusting the hand 41 of the gauge to the zero mark. For locking the anvil in adjusted positions in the bore 83 the lateral projection 9 is formed with a bore 87, the side of which intersects the side of the bore 83, the lower end of the bore 87 being of reduced diameter and screw threaded for receiving the screw 89, the under side of the head 91 of which latter is received in the large diameter portion of the bore and is tapered as indicated at 93 so as to engage the shank 81 of the anvil and by wedge action securely lock said anvil in immovable relation to the lateral projection 9.

It will be understood that wide deviations may be made from the embodiment of the invention herein described without departing from the spirit of the invention.

I claim:

1. A gauge of the character described having, in combination, a casing, an indicator carried by said casing comprising a cooperating relatively movable dial and pointer, mechanism housed by said casing for causing relative motion between said dial and pointer, means including a part projecting from said casing for yieldingly engaging the work and operating said mechanism, the latter including a train of gearing having a gear wheel a portion of the periphery of which projects from said casing.

2. A gauge of the character described having, in combination, a casing, an indicator carried by said casing comprising a cooperating relatively movable dial and pointer, means including a train of gearing in said casing and a cooperating part projecting from said casing for contacting with the work and causing relative motion between said dial and pointer, spring means cooperating with said train of gearing for causing yielding contact of said part with the work, said train of gearing comprising a gear wheel the periphery of which projects from said casing.

3. A gauge of the character described having, in combination, a casing, an indicator carried by said casing comprising a cooperating relatively movable dial and pointer, means including a train of gearing in said casing and a cooperating part projecting from said casing for yieldingly contacting with the work and causing relative motion between said dial and pointer, said train of gearing comprising a gear wheel a portion of the periphery of which projects from said casing, and said means including a torsion spring cooperating with said gear wheel for urging it to rotate in one direction.

4. A gauge of the character described having, in combination, a casing, an indicator carried by said casing, a contact feeler part at the exterior of said casing, a train of gearing in said casing operatively connecting said contact feeler part to said indicator for actuating the latter, and a gear wheel having a portion of its periphery projecting from said casing, said gear wheel meshing with said train of gearing for moving said contact feeler part.

5. A gauge of the character described having, in combination, a casing, an indicator carried by said casing, a contact feeler part at the exterior of said casing, a train of gearing operatively connecting said contact feeler part to said indicator for actuating the latter, spring actuated means operatively connected to said contact feeler part for urging it in one direction, and a gear wheel meshing with said train of gearing having a portion of its periphery projecting from said casing for moving said contact feeler part in the opposite direction.

6. A gauge of the character described having, in combination, a casing, an indicator carried by said casing, a contact feeler part reciprocally mounted on said casing, means operatively connecting said part to said indicator for actuation of the latter, a gear wheel having a peripheral portion projecting from said casing, means operatively connecting said gear wheel to said part for actuation of the latter, and a spring cooperating with said gear wheel for urging movement of said part in one direction.

7. A gauge of the character described having, in combination, a casing, a contact feeler reciprocally mounted on said casing, indicator mechanism in said casing actuated by said contact feeler, said indicator mechanism comprising rack teeth formed on said contact feeler and a rack pinion meshing therewith, a gear wheel mounted in said casing in mesh with said rack pinion, said gear wheel having a portion of its periphery projecting through the side walls of said casing for manual operation thereof, and a torsion spring cooperating with said gear wheel for urging said contact feeler outwardly of said casing.

8. A gauge of the character described having, in combination, a plate-like member formed with an opening providing a casing and with an arm extending from said casing, the latter integrally carrying a laterally projecting arm at one side of said casing, whereby work to be gauged may be placed between said laterally projecting arm and said casing, said plate-like member also formed with a handle member at the side thereof opposite said laterally projecting arm, a contact feeler rod reciprocally mounted on said casing and having an end portion for contact with the work placed in said space, indicator mechanism in said casing, said indicator mechanism comprising a rack pinion and cooperating rack teeth formed on said contact feeler rod, a gear wheel having a peripheral portion projecting from the side walls of said casing, said gear wheel meshing with said rack pinion, and a torsion spring cooperating with said gear wheel for urging said contact feeler rod toward said laterally projecting arm.

9. In a gauge of the character described, a casing, indicator mechanism in said casing, a contact feeler rod for actuating said indicator mechanism, said rod being reciprocally mounted in said casing, said casing having a bore through which said rod extends, a cylindrical bore intersecting said first mentioned bore, a cylindrical pin having a tapered flattened side to constitute a wedge, said wedge being reciprocal in said cylindrical bore for engaging said rod and locking it against movement.

10. A gauge of the character described having, in combination, a casing, a contact feeler movably carried by said casing, indicator mechanism in said casing comprising a rack actuated by said contact feeler, a rack pinion meshing with said rack, an indicator hand moved by said rack pinion, a center pinion, means for driving said center pinion by said rack pinion at ten times the number of revolutions of the latter, an indicator hand moved by said center pinion, and means operative from the exterior of said casing comprising a gear member in mesh with said rack pinion for rotating the latter.

11. A gauge of the character described having, in combination, a casing, a contact feeler movably carried by said casing, indicator mechanism in said casing comprising a rack actuated by said contact feeler, a rack pinion meshing with said rack, an indicator hand moved by said rack pinion, a center pinion, means for driving said center pinion by said rack pinion at ten times the number of revolutions of the latter, an indicator hand moved by said center pinion, means operative from the exterior of said casing comprising a gear member in mesh with said rack pinion for rotating the latter, and spring means acting upon the last mentioned means for urging movement thereof in one direction.

WARREN AMES.